US012465417B2

United States Patent
Simonsen

(10) Patent No.: US 12,465,417 B2
(45) Date of Patent: Nov. 11, 2025

(54) ELECTROSURGICAL ELECTRODES, ELECTROSURGICAL TOOLS, AND METHODS OF MAKING ELECTROSURGICAL ELECTRODES

(71) Applicant: Stryker European Operations Limited, Cork (IE)

(72) Inventor: Jesper Schantz Simonsen, Jyderup (DK)

(73) Assignee: Stryker European Operations Limited, Carrigtwohill County (IE)

( * ) Notice: Subject to any disclaimer, the term of this patent is extended or adjusted under 35 U.S.C. 154(b) by 833 days.

(21) Appl. No.: 17/615,476

(22) PCT Filed: May 29, 2020

(86) PCT No.: PCT/IB2020/000422
§ 371 (c)(1),
(2) Date: Nov. 30, 2021

(87) PCT Pub. No.: WO2020/240276
PCT Pub. Date: Dec. 3, 2020

(65) Prior Publication Data
US 2022/0241004 A1    Aug. 4, 2022

Related U.S. Application Data

(60) Provisional application No. 62/854,374, filed on May 30, 2019.

(51) Int. Cl.
*A61B 18/14* (2006.01)
*A61B 18/00* (2006.01)

(52) U.S. Cl.
CPC ............ *A61B 18/1402* (2013.01); *A61B 2018/00077* (2013.01); *A61B 2018/00083* (2013.01);
(Continued)

(58) Field of Classification Search
CPC ...... A61B 18/1402; A61B 2018/00077; A61B 2018/00083; A61B 2018/00136;
(Continued)

(56) References Cited

U.S. PATENT DOCUMENTS

| 5,702,387 A | 12/1997 | Arts et al. |
| 5,951,549 A | 9/1999 | Richardson et al. |

(Continued)

FOREIGN PATENT DOCUMENTS

| EP | 1 527 745 A2 | 5/2005 |
| WO | 99/40858 A1 | 8/1999 |

(Continued)

OTHER PUBLICATIONS

International Search Report mailed on Nov. 20, 2020, issued in connection with International Application No. PCT/IB2020/000422, filed on May 29, 2020, 5 pages.

(Continued)

*Primary Examiner* — Thomas A Giuliani
*Assistant Examiner* — Abigail M Ziegler
(74) *Attorney, Agent, or Firm* — McDonnell Bochnen Hulbert & Berghoff LLP

(57) ABSTRACT

In an example, an electrode includes an elongated body, a conductive layer, and an insulator layer. The elongated body includes a first conductive material and extends in an axial direction from a proximal end to a distal end. The proximal end is configured to receive electrosurgical energy from the electrosurgical tool. The elongated body includes a blade for at least one of cutting or coagulation of tissue by the electrosurgical energy received from the electrosurgical tool. The conductive layer includes a second conductive material coupled to the blade of the elongated body. The second conductive material is different than the first conductive material. The insulator layer includes a non-conductive (Continued)

material and is coupled to the conductive layer. The insulator layer covers a first portion of the conductive layer, and does not cover a second portion of the conductive layer such that the conductive layer is exposed at the second portion.

16 Claims, 9 Drawing Sheets

(52) U.S. Cl.
CPC ............. *A61B 2018/00136* (2013.01); *A61B 2018/00607* (2013.01); *A61B 2018/1412* (2013.01)

(58) Field of Classification Search
CPC .. A61B 2018/00607; A61B 2018/1412; A61B 2018/00589; A61B 2018/00601
USPC ......................................................... 606/45
See application file for complete search history.

(56) References Cited

U.S. PATENT DOCUMENTS

| | | | |
|---|---|---|---|
| 8,439,910 B2 | 5/2013 | Greep | |
| 2001/0031964 A1 | 10/2001 | Gentelia et al. | |
| 2011/0184410 A1* | 7/2011 | Greep | A61B 18/1402 606/41 |
| 2012/0215217 A1* | 8/2012 | Horner | A61B 18/148 606/41 |
| 2014/0336642 A1* | 11/2014 | Nesbitt | A61B 17/320016 606/41 |
| 2016/0199118 A1* | 7/2016 | Borgmeier | A61B 18/14 606/45 |
| 2017/0172646 A1 | 6/2017 | Patel et al. | |
| 2018/0147004 A1 | 5/2018 | Decou | |
| 2018/0256244 A1 | 9/2018 | Cosmescu | |
| 2020/0093537 A1 | 3/2020 | Fischer et al. | |
| 2022/0226037 A1 | 7/2022 | Buckley et al. | |

FOREIGN PATENT DOCUMENTS

| | | |
|---|---|---|
| WO | 2011/090507 A1 | 7/2011 |
| WO | 2019/072819 A1 | 4/2019 |

OTHER PUBLICATIONS

Written Opinion mailed on Nov. 20, 2020, issued in connection with International Application No. PCT/IB2020/000422, filed on May 29, 2020, 9 pages.

Communication pursuant to Article 94(3) EPC prepared by the European Patent Office in application No. EP 20 735 019.0 dated Nov. 7, 2024.

* cited by examiner

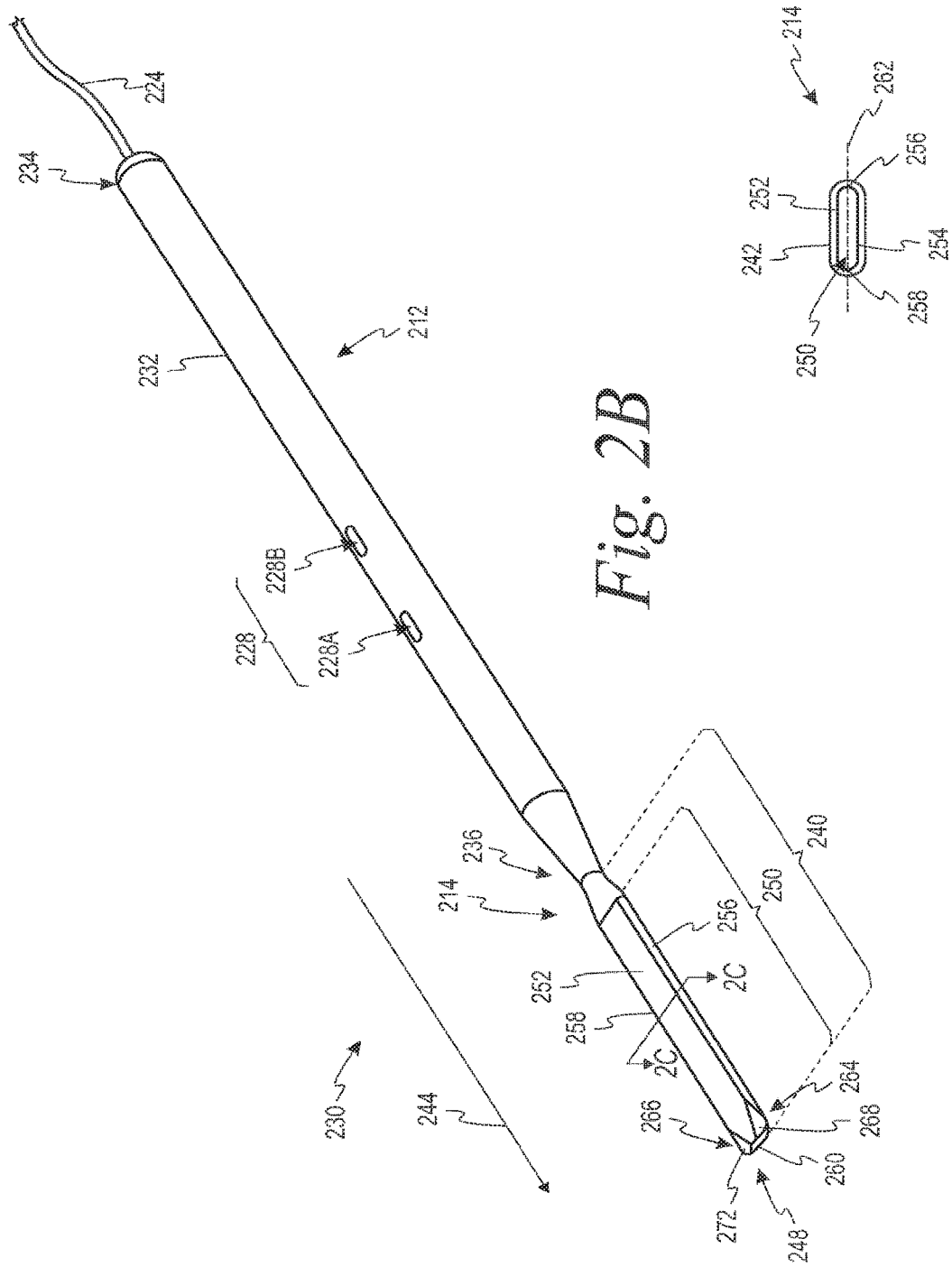

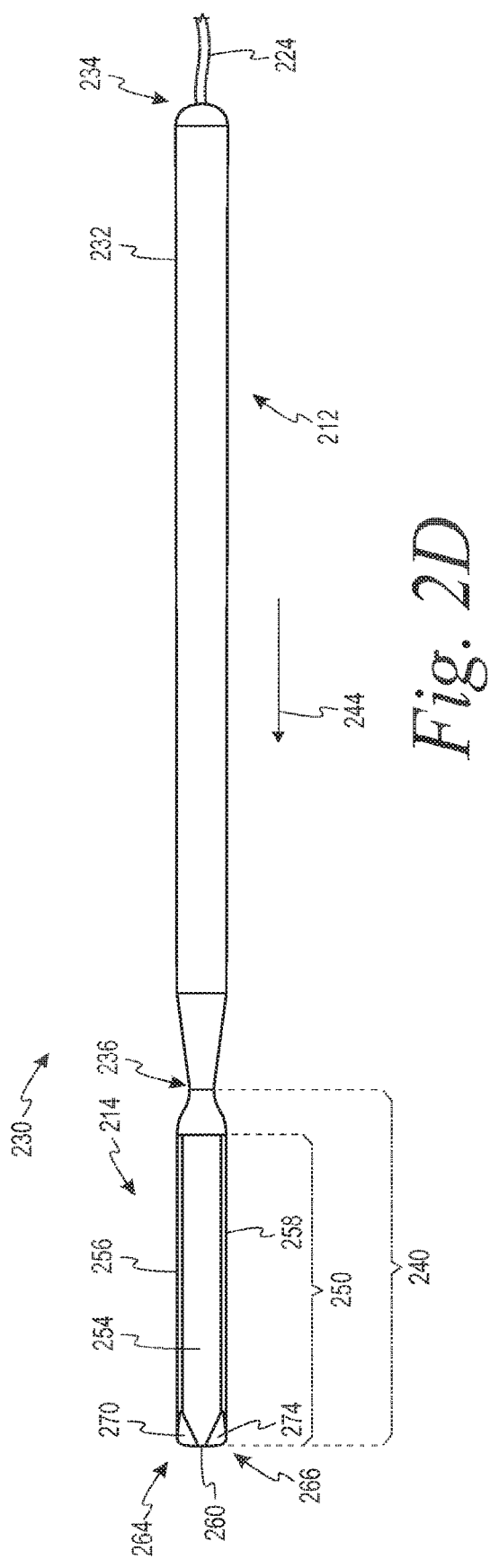
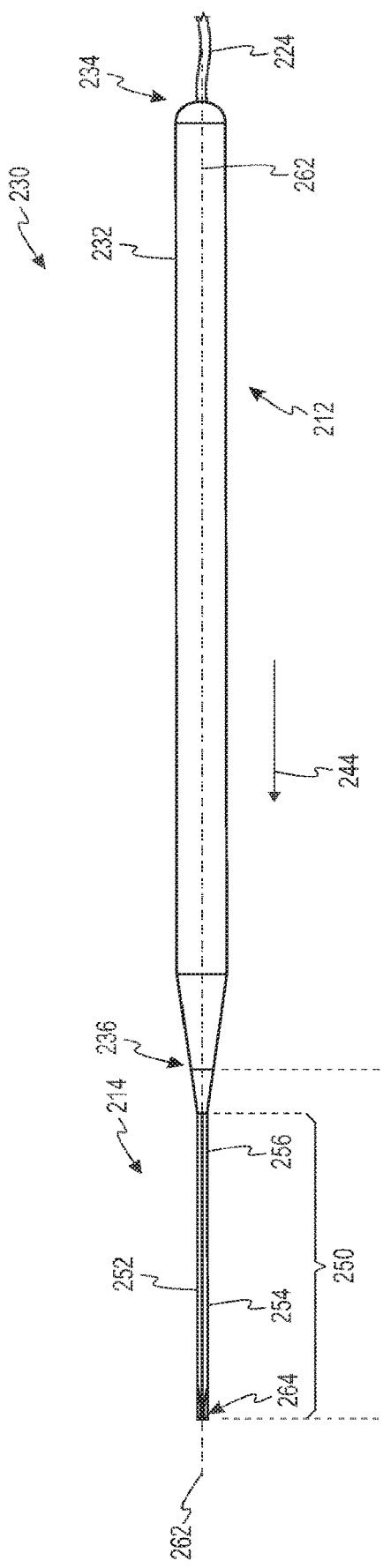
Fig. 2D
Fig. 2E

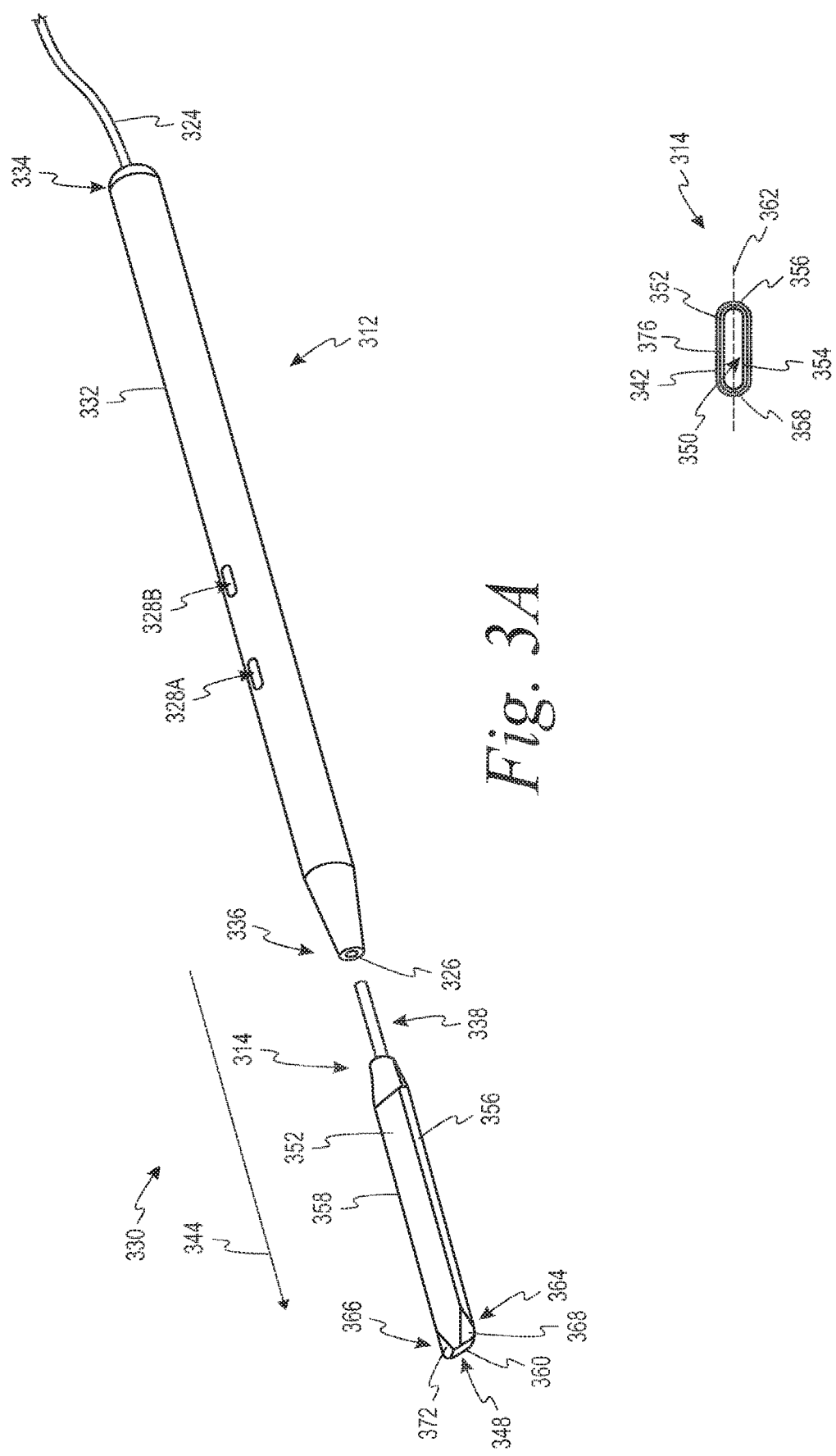

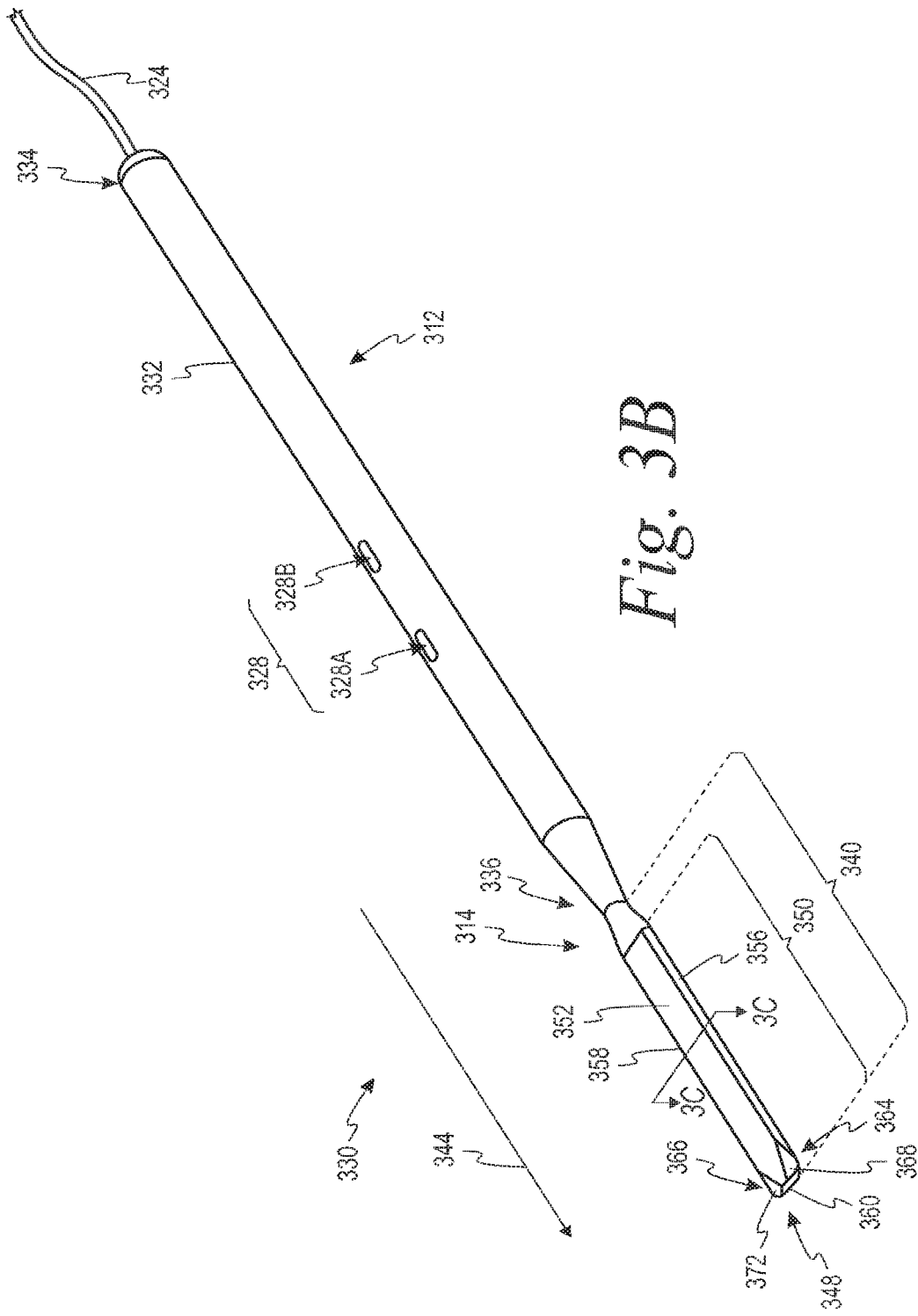

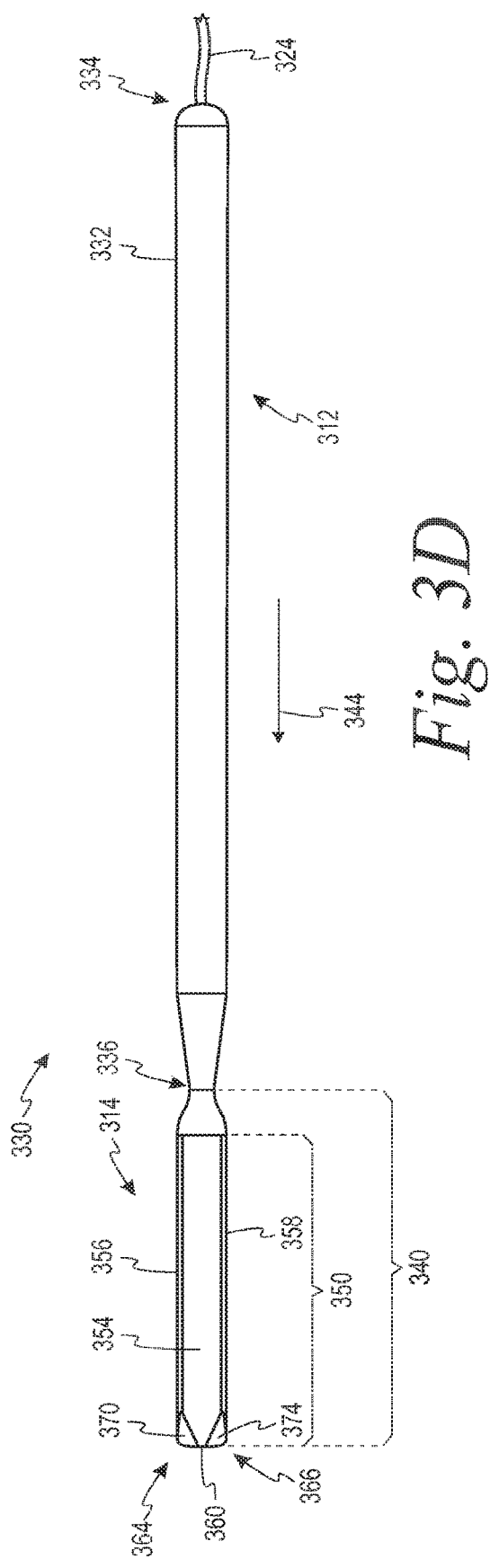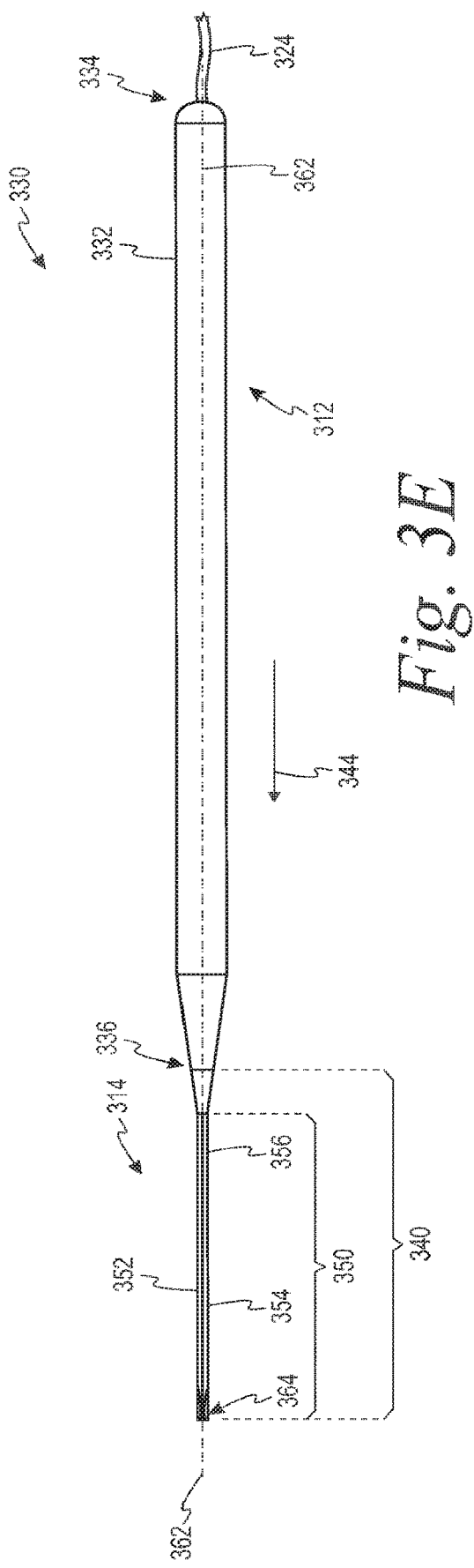

ELECTROSURGICAL ELECTRODES, ELECTROSURGICAL TOOLS, AND METHODS OF MAKING ELECTROSURGICAL ELECTRODES

CROSS-REFERENCE TO RELATED APPLICATIONS

The present application is a U.S. national phase of International Application No. PCT/IB2020/000422, filed on May 29, 2020, which claims the benefit of priority to U.S. Application No. 62/854,374, filed May 30, 2019, the contents of which are hereby incorporated by reference in their entirety.

FIELD

The present disclosure generally relates to electrosurgery and, in particular, to an electrosurgical devices, electrosurgical electrodes, and methods of making electrosurgical electrodes.

BACKGROUND

Electrosurgery involves applying a radio frequency (RF) electric current (also referred to as electrosurgical energy) to biological tissue to cut, coagulate, or modify the biological tissue during an electrosurgical procedure. Specifically, an electrosurgical generator generates and provides the electric current to an active electrode, which applies the electric current (and, thus, electrical power) to the tissue. The electric current passes through the tissue and returns to the generator via a return electrode (also referred to as a "dispersive electrode"). As the electric current passes through the tissue, an impedance of the tissue converts a portion of the electric current into thermal energy (e.g., via the principles of resistive heating), which increases a temperature of the tissue and induces modifications to the tissue (e.g., cutting, coagulating, ablating, and/or sealing the tissue). Accordingly, an extent to which the tissue is affected by the electrosurgery is related to the electrical power transmitted from the active electrode to the tissue.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 2B is a perspective view of the electrosurgical tool shown in FIG. 2A with the electrode coupled to the electrosurgical pencil, according to an example.

FIG. 2C is a cross-sectional view of the electrode shown in FIGS. 2A-2B, according to an example.

FIG. 2D is a side view of the electrosurgical tool shown in FIG. 2B, according to an example.

FIG. 2E is a lateral side view of the electrosurgical tool shown in FIG. 2B, according to an example.

FIG. 3A is a perspective view of an electrosurgical tool with an electrode decoupled from a electrosurgical pencil, according to an example.

FIG. 3B is a perspective view of the electrosurgical tool shown in FIG. 3A with the electrode coupled to the electrosurgical pencil, according to an example.

FIG. 3C is a cross-sectional view of the electrode shown in FIGS. 3A-3B, according to an example.

FIG. 3D is a side view of the electrosurgical tool shown in FIG. 3B, according to an example.

FIG. 3E depicts a lateral side view of the electrosurgical tool shown in FIG. 3B, according to an example.

DETAILED DESCRIPTION

Figure 1:
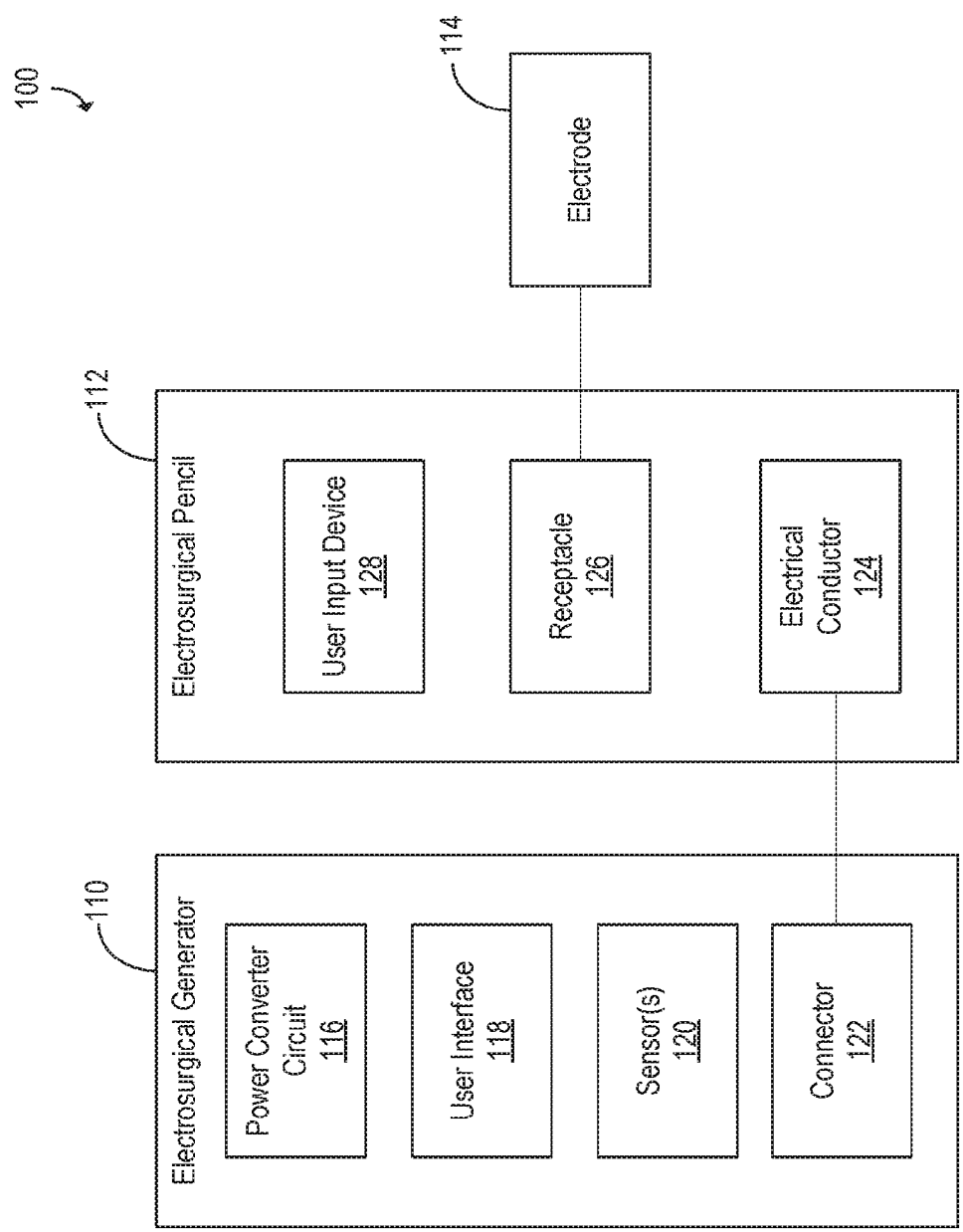
FIG. 1 is a simplified block diagram of an electrosurgical system, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

As noted above, the extent to which a tissue is affected by electrosurgery is related to the electrosurgical energy transmitted from the active electrode to the tissue. In practice, the electrosurgical energy transmitted from the active electrode to the tissue can be related to, among other things, a physical configuration (e.g., a size and/or a shape) and/or a material composition of the active electrode. Within examples, the present disclosure provides for electrodes having physical configurations and/or material compositions that can improve one or more aspects of an electrosurgery procedure.

In one example, an electrode can include an elongated body formed from a conductive material and an insulator layer that covers a blade of the elongated body, except at one or more corners of the blade. As such, the conductive material can be exposed at the corner(s). This can help to concentrate the electrosurgical energy at the corner(s) of the blade, which can help to achieve a relatively narrower and more precise application of the electrosurgical energy to the target tissue. As such, the electrode can beneficially reduce the electrosurgical energy applied to other tissue adjacent to the target tissue, mitigating (or preventing) increasing a temperature of the other tissue and/or cellular damage to the other tissue. Additionally or alternatively, for example, by concentrating the electrosurgical energy at the corner(s) via the insulator layer, the electrode can allow an electrosurgical generator to operate at a relatively lower power setting to achieve a similar electrosurgical energy density as a conventional electrode that does not have an insulator layer exposing the corner(s).

In another example, an electrode can include one or more features that help to mitigate tissue adhering to the electrode during electrosurgery. For instance, during some electrosurgery procedures using a conventional electrode, tissue may adhere to the electrode and, thus, change an effective size and/or shape of the electrode for subsequent portions of the electrosurgery procedures. In some instances, this can impair the conventional electrode from making relatively narrow and precise incisions, thereby negatively impacting a quality and/or a speed of the electrosurgical procedure.

In an example, an electrode can include an elongated body made from a first conductive material, a conductive layer covering a blade of the elongated body and made from a second conductive material, and an insulator layer made from a non-conductive material. The insulator layer covers a first portion of the conductive layer (and the blade) and the insulator layer does not cover a second portion of the conductive layer (and the blade) such that the second conductive material of the conductive layer is exposed at the second portion. This can help to concentrate the electrosurgical energy at the second portion (which is exposed) of the conductive layer (and the blade), which can help to achieve a relatively narrower and more precise application of the electrosurgical energy to the target tissue.

Additionally, the second conductive material can have a relatively low coefficient of friction. Covering the blade with the conductive layer made from the second conductive material having a relatively low coefficient of friction can help to mitigate tissue adhering to the electrode as the electrode moves through the target tissue during electrosurgery and, thus, improve the quality and/or speed of the electrosurgical procedure.

Referring now to FIG. 1, an electrosurgical system 100 is shown according to an example. As shown in FIG. 1, the electrosurgical system 100 includes an electrosurgical generator 110, an electrosurgical pencil 112, and an electrode 114. In general, the electrosurgical generator 110 can generate electrosurgical energy that is suitable for performing electrosurgery on a patient. For instance, the electrosurgical generator 110 can include a power converter circuit 116 that can convert a grid power to an RF output power. As an example, the power converter circuit 116 can include one or more electrical components (e.g., one or more transformers) that can control a voltage, a current, and/or a frequency of the RF output power.

Within examples, the electrosurgical generator 110 can include a user interface 118 that can receive one or more inputs from a user and/or provide one or more outputs to the user. As examples, the user interface 118 can include one or more buttons, one or more switches, one or more dials, one or more keypads, one or more touchscreens, and/or one or more display screens.

In an example, the user interface 118 can be operable to select a mode of operation from among a plurality of modes of operation for the electrosurgical generator 110. As examples, the modes of operation can include a cutting mode, a coagulating mode, an ablating mode, and/or a sealing mode. In one implementation, the modes of operation can correspond to respective waveforms for the RF output power. As such, in this implementation, the electrosurgical generator 110 can generate the RF output power with a waveform selected from a plurality of waveforms based, at least in part, on the mode of operation selected using the user interface 118.

The electrosurgical generator 110 can also include one or more sensors 120 that can sense one or more conditions related to the RF output power and/or the target tissue. As examples, the sensor(s) 120 can include one or more current sensors, one or more voltage sensors, and/or one or more temperature sensors. Within examples, the electrosurgical generator 110 can additionally or alternatively generate the RF output power with an amount of electrosurgical energy (e.g., an electrical power) and/or a waveform selected from among the plurality of waveforms based on one or more parameters related to the condition(s) sensed by the sensor(s) 120.

In one example, the RF output power can have a frequency that is greater than approximately 100 kilohertz (KHz) to reduce (or avoid) stimulating a muscle and/or a nerve near the target tissue. In another example, the RF output power can have a frequency that is between approximately 300 kHz and approximately 500 kHz.

As shown in FIG. 1, the electrosurgical generator 110 can also include a connector 122 that can facilitate coupling the electrosurgical generator 110 to the electrosurgical pencil 112. For example, the electrosurgical pencil 112 can include an electrical conductor 124 (e.g., a power cord) having a plug, which can be coupled to a socket of the connector 122 of the electrosurgical generator 110. In this arrangement, the electrosurgical generator 110 can supply the RF output power to the electrosurgical pencil 112 via the coupling between the connector 122 of the electrosurgical generator 110 and the electrical conductor 124 of the electrosurgical pencil 112.

As shown in FIG. 1, the electrosurgical pencil 112 can include a receptacle 126 that can couple the electrode 114 to the electrosurgical pencil 112. As an example, the receptacle 126 and the electrode 114 can be configured to couple to each other by friction-fit. Accordingly, the receptacle 126 and the electrode 114 can have respective sizes and/or respective shapes that provide for a friction-fit coupling between the receptacle 126 and the electrode 114 when the electrode 114 is inserted in the receptacle 126. This can allow for the electrode 114 to be releasably coupled to the electrosurgical pencil 112, which can facilitate an interchangeability of a plurality of the electrodes 114 with the electrosurgical pencil 112. In other examples, the electrode 114 can be coupled to the receptacle 126 by another type of releasable coupling (e.g., a threaded coupling) and/or a non-releasable coupling (e.g., via welding and/or soldering).

Within examples, the receptacle 126 can also include a conductor that can electrically couple the electrode 114 to the RF output power supplied to the electrosurgical pencil 112 by the electrosurgical generator 110. For instance, the receptacle 126 can be electrically coupled to the electrical conductor 124 by the conductor. In this way, the receptacle 126 can supply the electrosurgical energy from the electrosurgical generator 110 via the electrical conductor 124 to the electrode 114.

As shown in FIG. 1, in some examples, the electrosurgical pencil 112 can include at least one user input device 128 that can select between the modes of operation of the electrosurgical generator 110. For instance, in one implementation, the at least one user input device 128 can be configured to select between a cutting mode of operation and a coagulation mode of operation. Responsive to actuation of the at least one user input device 128 of the electrosurgical pencil 112, the electrosurgical pencil 112 can (i) receive the RF output power with a level of power and/or a waveform corresponding to the mode of operation selected via the at least one user input and (ii) supply the RF output power to the electrode 114 coupled to the receptacle 126 of the electrosurgical pencil 112.

Figure 2A:
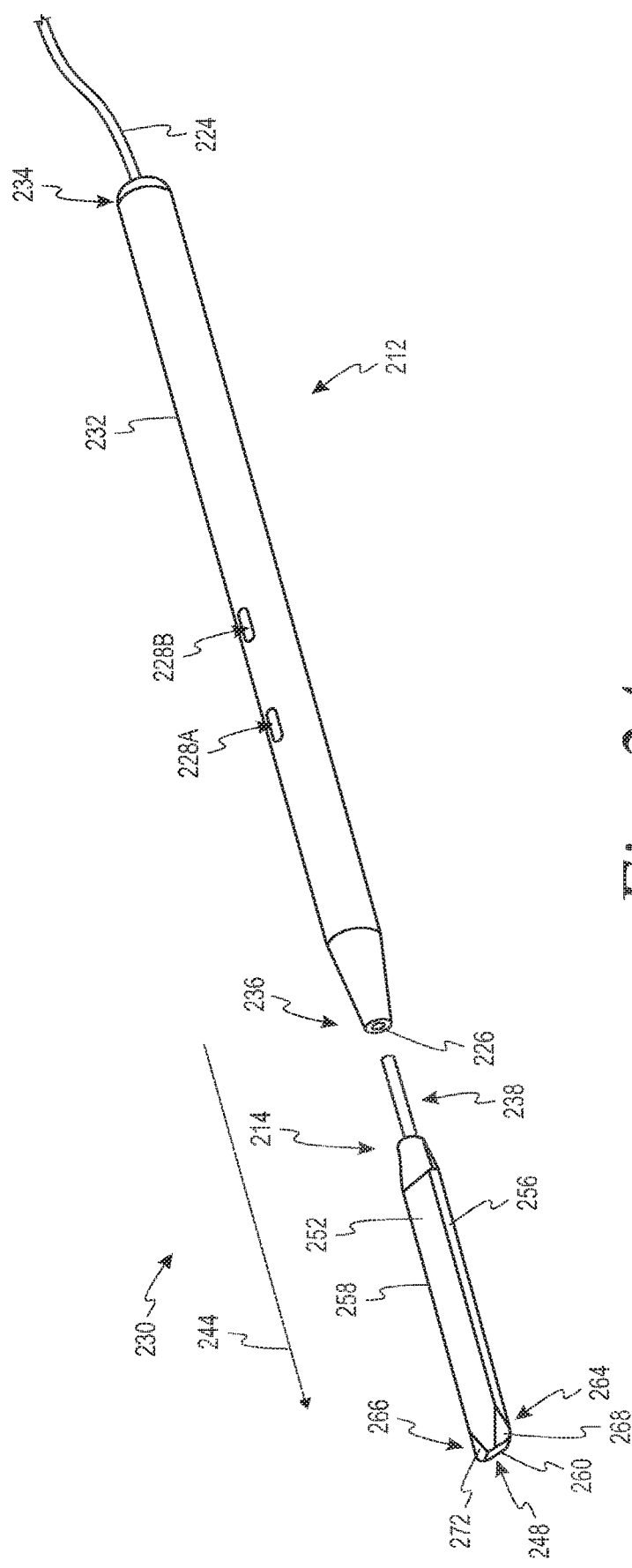
FIG. 2A is a perspective view of an electrosurgical tool with an electrode decoupled from a electrosurgical pencil, according to an example.

Referring now to FIGS. 2A-2E, an electrosurgical tool 230 including an electrosurgical pencil 212 and an electrode 214 is shown according to another example. Specifically, FIG. 2A depicts a perspective view of the electrosurgical tool 230 with the electrode 214 decoupled from the electrosurgical pencil 212, FIG. 2B depicts a perspective view of the electrosurgical tool 230 with the electrode 214 coupled to the electrosurgical pencil 212, FIG. 2C depicts a cross-sectional view of the electrode 214, FIG. 2D depicts a side view of the electrosurgical tool 230 with the electrode 214 coupled to the electrosurgical pencil 212, and FIG. 2E depicts a lateral side view of the electrosurgical tool 230 with the electrode 214 coupled to the electrosurgical pencil 212, according to the example.

As shown in FIGS. 2A-2B and 2D-2E, the electrosurgical pencil 212 includes a housing 232 having a first end 234 and a second end 236. The housing 232 can be configured to facilitate a user gripping and manipulating the electrosurgical pencil 212 while performing electrosurgery. For example, the housing 232 can have a shape and/or a size that can facilitate a user performing electrosurgery by manipulating the electrosurgical pencil 212 and the electrode 214 using a single hand. In one implementation, the housing 232 can have a shape and/or a size that facilitates the user holding the electrosurgical pencil 212 in a writing utensil gripping manner.

Additionally, for example, the housing 232 can be constructed from one or more materials that are electrical insulators (e.g., a plastic material). This can facilitate insulating the user from the RF output power flowing through the electrosurgical pencil 212 while performing the electrosurgery.

As also shown in FIGS. 2A-2B and 2D-2E, the electrosurgical pencil 212 can include at least one electrical conductor 224 at the first end 234 and configured to couple to an electrosurgical generator (e.g., the electrosurgical generator 110 described above). As described above, the at least one electrical conductor 224 can include a power cord that can couple to a connector (e.g., plug into a socket) of the electrosurgical generator. As such, the at least one electrical conductor 224 can provide the RF output power from the electrosurgical generator to the electrosurgical pencil 212.

As shown in FIG. 2A, the electrosurgical pencil 212 includes a receptacle 226 at the second end 236 and configured to couple to a proximal end 238 of the electrode 214. For example, in FIG. 2A, the receptacle 226 and the proximal end 238 have corresponding shapes and/or sizes that facilitate coupling the proximal end 238 of the electrode 214 to the receptacle 226 by a friction-fit coupling. However, as described above, the receptacle 226 and the proximal end 238 of the electrode 214 can be coupled in other manners in other examples (e.g., via a threaded coupling, a weld coupling, and/or a solder coupling). Also, as described above, the receptacle 226 is configured to supply the electrosurgical energy from the at least one electrical conductor 224 to the electrode 214.

In the example shown in FIGS. 2A-2E, the electrosurgical pencil 212 is operable in a cutting mode of operation and a coagulation mode of operation. However, the electrosurgical pencil 212 can be operable in a lesser quantity of modes of operation, a greater quantity of modes of operation, and/or different types of modes of operation in other examples (e.g., such as the example modes of operation described above). As shown in FIGS. 2A-2B and 2D-2E, the electrosurgical pencil 212 includes at least one user input device 228 configured to select between the cutting mode of operation and the coagulation mode of operation. In particular, the at least one user input device 228 includes a first button 228A that can be actuated to operate the electrosurgical pencil 212 in a cutting mode of operation, and a second button 228B that can be actuated to operate the electrosurgical pencil 212 in a coagulation mode of operation.

Although the electrosurgical tool 230 is shown has having the first button 228A and the second button 228B on the electrosurgical pencil 212, the at least one user input device 228 can additionally or alternatively include a user interface on the electrosurgical generator (e.g., the user interface 118) and/or another external device (e.g., a footswitch) for operating the electrosurgical tool 230 in one or more modes of operation.

The electrode 214 includes an elongated body 240 and an insulator layer 242. The elongated body 240 includes an electrically conductive material and extends in an axial direction 244 from a proximal end 246 to a distal end 248. As examples, the electrically conductive material can include stainless steel. More generally, the electrically conductive material can include one or more materials that have an electrical conductivity that is suitable for conducting the electrosurgical energy (e.g., the RF output power) received from the electrosurgical pencil 212 from the proximal end 246 to the distal end 248.

Accordingly, the proximal end 246 can be configured to receive the electrosurgical energy from the electrosurgical pencil 212. For example, the electrically conductive material of the elongated body 240 can be exposed at the proximal end 246. This can facilitate the proximal end 246 of the elongated body 240 electrically coupling with the receptacle 226 of the electrosurgical pencil 212 as described above.

The distal end 248 can provide a working end for performing electrosurgery on the target tissue. For example, the elongated body 240 includes a blade 250 configured for at least one of cutting or coagulation of tissue by the electrosurgical energy received from the electrosurgical pencil 212.

As shown in FIGS. 2A-2E, the blade 250 includes a first major surface portion 252 extending, along the axial direction 244, on a first side of the blade 250 and a second major surface portion 254 extending, along the axial direction 244, on a second side of the blade 250. The first side of the blade 250 is opposite the second side of the blade 250. Additionally, as shown in FIGS. 2A-2E, the blade 250 includes (i) a first edge 256 at a first lateral interface between the first major surface portion 252 and the second major surface portion 254, (ii) a second edge 258 at a second lateral interface between the first major surface portion 252 and the second major surface portion 254, and (iii) a distal edge 260 at a distal interface between the first major surface portion 252 and the second major surface portion 254.

As shown in FIG. 2C, the first major surface portion 252 and the second major surface portion 254 can be on opposing sides of an intermediate plane 262 extending through the first edge 256, the second edge 258, and the distal edge 260. In some implementations, the first major surface portion 252 and the second major surface portion 254 can be symmetrical about the intermediate plane 262. Also, in some implementations, the first major surface portion 252 and the second major surface portion 254 can each extend in a respective plane that is substantially parallel to the intermediate plane 262.

Referring back to FIGS. 2A-2B and 2D-2E, the blade 250 includes a first corner 264 extending from the first edge 256 to the distal edge 260, and a second corner 266 extending from the second edge 258 to the distal edge 260. In some examples, the first corner 264 and the second corner 266 can each have a curved shape at the intermediate plane 262. For instance, the first corner 264 and the second corner 266 can each be defined by a radius of curvature.

In some examples, the first corner 264 and the second corner 266 each have a tapered shape. For instance, as shown in FIGS. 2A-2B and 2D-2E, the first corner 264 can include a first face 268 on the first side and a second face 270 on the second side, and the first face 268 and the second face 270 extend in respective planes at respective acute angles relative to the intermediate plane 262. Similarly, the second corner 266 can include a third face 272 and a fourth face 274, and the third face 272 and the fourth face 274 extend in respective planes at respective acute angles relative to the intermediate plane 262. As an example, the respective acute angles of the first face 268, the second face 270, the third face 272, and the fourth face 274 relative to the intermediate plane 262 are each between approximately 5 degrees and approximately 45 degrees. Providing the first corner 264 and/or the second corner 266 with a tapered shape can help to increase a density of the electrosurgical energy (e.g., a electric current density) at the first corner 264 and/or the second corner 266.

Also, for example, the first corner 264 and/or the second corner 266 can taper from (i) a thickness of approximately 0.2 mm at respective interfaces with the first major surface portion 252 and/or the second major surface portion 254 to (ii) a thickness of approximately 0.5 mm at the intermediate plane 262. This can, for example, provide the first corner 264 and/or the second corner 266 with a sufficiently sharp edge to facilitate using the first corner 264 and/or the corner 266 as a scalpel for cutting the target tissue before, during, or after applying the electrosurgery energy to the target tissue. Other examples are also possible.

Although the first corner 264 and the second corner 266 have a tapered shape and a curved shape in FIGS. 2A-2B and 2D-2E, the first corner 264 and/or the second corner 266 can have a different shape in other examples. For instance, in another example, the first corner 264 and/or the second corner 266 can omit the first face 268, the second face 270, the third face 272, and/or the fourth face 274 such that the first corner 264 and/or the second corner 266 are co-planar with the first major surface portion 252 and/or the second major surface portion 254. Also, for instance, the first corner 264 and/or the second corner 266 can additionally or alternatively have a shape that is not defined by a radius of curvature in other examples.

The insulator layer 242 includes a non-conductive material and is coupled to the elongated body 240. More particularly, the insulator layer 242 covers a first portion of the blade 250 and the insulator layer 242 does not cover a second portion of the blade 250 such that the conductive material of the elongated body 240 is exposed at the second portion. This can help to concentrate the electrosurgical energy at the second portion (which is exposed) of the blade 250, which can help to achieve a relatively narrower and more precise application of the electrosurgical energy to the target tissue. As such, the electrode 214 can beneficially reduce the electrosurgical energy applied to other tissue adjacent to the target tissue, mitigating (or preventing) increasing a temperature of the other tissue and/or cellular damage to the other tissue.

For example, as shown in FIGS. 2A-2B and 2D-2E, the first portion of the blade 250 can include the first major surface portion 252, the second major surface portion 254, the first edge 256, the second edge 258, and/or the distal edge 260. Whereas, the second portion of the blade 250 can include the first corner 264 and the second corner 266. Thus, in this example, the conductive material of the elongated body 240 is exposed at the first corner 264 and the second corner 266 such that the electrosurgical energy is concentrated at the first corner 264 and the second corner 266. As such, in operation, the first corner 264 and the second corner 266 can be used to apply the electrosurgical energy to the target tissue in a relatively narrow and precise manner that facilitates cutting and/or coagulating the target tissue with improved performance relative to a conventional electrode that is entirely covered by an insulator.

Additionally, for example, by concentrating the electrosurgical energy at the first corner 264 and/or the second corner 266 via the insulator layer 242 and/or the tapered shape of the first corner 264 and the second corner 266, the electrode 214 can allow the electrosurgical generator to operate at a relatively lower power setting to achieve a similar electrosurgical energy density as a conventional electrode that does not have these feature(s).

In some examples, a surface area of the second portion of the blade 250 can be approximately 1 percent to approximately 30 percent of a total surface area of the blade 250. Also, as examples, the non-conductive material of the insulator layer 242 can include at least one of silicone, siloxane or Teflon.

As described above, the proximal end 246 can be configured to receive the electrosurgical energy from the electrosurgical pencil 212. In FIGS. 2A-2E, the insulator layer 242 does not cover the proximal end 246 of the elongated body 240 such that the conductive material of the elongated body 240 is exposed at the proximal end 246.

Referring now to FIGS. 3A-3E, an electrosurgical tool 330 including an electrosurgical pencil 312 and an electrode 314 is shown according to another example. Specifically, FIG. 3A depicts a perspective view of the electrosurgical tool 330 with the electrode 314 decoupled from the electrosurgical pencil 312, FIG. 3B depicts a perspective view of the electrosurgical tool 330 with the electrode 314 coupled to the electrosurgical pencil 312, FIG. 3C depicts a cross-sectional view of the electrode 314, FIG. 3D depicts a side view of the electrosurgical tool 330 with the electrode 314 coupled to the electrosurgical pencil 312, and FIG. 3E depicts a lateral side view of the electrosurgical tool 330 with the electrode 314 coupled to the electrosurgical pencil 312, according to the example.

The electrosurgical tool 330 is substantially similar or identical to the electrosurgical tool 230 shown in FIGS. 2A-2E, except the electrode 314 includes a conductive layer 376 of a second conductive material between an elongated body 340 of the electrode 314 and an insulator layer 342 of the electrode 314. As described in further detail below, the conductive layer 376 can help to mitigate (or prevent) tissue adhering to the electrode 314 during electrosurgery.

As shown in FIGS. 3A-3B and 3D-3E, the electrosurgical pencil 312 includes a housing 332 having a first end 334 and a second end 336. The housing 332 can be configured to facilitate a user gripping and manipulating the electrosurgical pencil 312 while performing electrosurgery. For example, the housing 332 can have a shape and/or a size that can facilitate a user performing electrosurgery by manipulating the electrosurgical pencil 312 and the electrode 314 using a single hand. In one implementation, the housing 332 can have a shape and/or a size that facilitates the user holding the electrosurgical pencil 312 in a writing utensil gripping manner.

Additionally, for example, the housing 332 can be constructed from one or more materials that are electrical insulators (e.g., a plastic material). This can facilitate insulating the user from the electrosurgical energy (e.g., the RF output power) flowing through the electrosurgical pencil 312 while performing the electrosurgery.

As also shown in FIGS. 3A-3B and 3D-3E, the electrosurgical pencil 312 can include at least one electrical conductor 324 at the first end 334 and configured to couple to an electrosurgical generator (e.g., the electrosurgical generator 110 described above). As described above, the at least one electrical conductor 324 can include a power cord that can couple to a connector (e.g., plug into a socket) of the electrosurgical generator. As such, the at least one electrical conductor 324 can provide the RF output power from the electrosurgical generator to the electrosurgical pencil 312.

As shown in FIG. 3A, the electrosurgical pencil 312 includes a receptacle 326 at the second end 336 and configured to couple to a proximal end 338 of the electrode 314. For example, in FIG. 3A, the receptacle 326 and the proximal end 338 have corresponding shapes and/or sizes that facilitate coupling the proximal end 338 of the electrode 314 to the receptacle 326 by a friction-fit coupling. However, as described above, the receptacle 326 and the proximal end 338 of the electrode 314 can be coupled in other manners in other examples (e.g., via a threaded coupling, a weld coupling, and/or a solder coupling). Also, as described above, the receptacle 326 is configured to supply the electrosurgical energy from the at least one electrical conductor 324 to the electrode 314.

In the example shown in FIGS. 3A-3E, the electrosurgical pencil 312 is operable in a cutting mode of operation and a coagulation mode of operation. However, the electrosurgical pencil 312 can be operable in a lesser quantity of modes of operation, a greater quantity of modes of operation, and/or different types of modes of operation in other examples (e.g., such as the example modes of operation described above). As shown in FIGS. 3A-3B and 3D-3E, the electrosurgical pencil 312 includes at least one user input device 328 configured to select between the cutting mode of operation and the coagulation mode of operation. In particular, the at least one user input device 328 includes a first button 328A that can be actuated to operate the electrosurgical pencil 312 in a cutting mode of operation, and a second button 328B that can be actuated to operate the electrosurgical pencil 312 in a coagulation mode of operation.

Although the electrosurgical tool 330 is shown has having the first button 328A and the second button 328B on the electrosurgical pencil 312, the at least one user input device 328 can additionally or alternatively include a user interface on the electrosurgical generator (e.g., the user interface 118) and/or another external device (e.g., a footswitch) for operating the electrosurgical tool 330 in one or more modes of operation.

The electrode 314 includes the elongated body 340, the insulator layer 342, and the conductive layer 376. The elongated body 340 includes a first conductive material and extends in an axial direction 344 from a proximal end 346 to a distal end 348. More generally, the first conductive material can include one or more materials that have an electrical conductivity that is suitable for conducting the electrosurgical energy (e.g., the RF output power) received from the electrosurgical pencil 312 from the proximal end 346 to the distal end 348.

Accordingly, the proximal end 346 can be configured to receive the electrosurgical energy from the electrosurgical pencil 312. For example, as described above, the insulator layer 342 does not cover the proximal end 346 of the elongated body 340. This can facilitate the proximal end 346 of the elongated body 340 electrically coupling with the receptacle 326 of the electrosurgical pencil 312 as described above.

The distal end 348 can provide a working end for performing electrosurgery on the target tissue. For example, the elongated body 340 includes a blade 350 configured for at least one of cutting or coagulation of tissue by the electrosurgical energy received from the electrosurgical pencil 312.

As shown in FIGS. 3A-3E, the blade 350 can include a first major surface portion 352 extending, along the axial direction 344, on a first side of the blade 350 and a second major surface portion 354 extending, along the axial direction 344, on a second side of the blade 350. The first side of the blade 350 is opposite the second side of the blade 350. Additionally, as shown in FIGS. 3A-3E, the blade 350 can include (i) a first edge 356 at a first lateral interface between the first major surface portion 352 and the second major surface portion 354, (ii) a second edge 358 at a second lateral interface between the first major surface portion 352 and the second major surface portion 354, and (iii) a distal edge 360 at a distal interface between the first major surface portion 352 and the second major surface portion 354.

As shown in FIG. 3C, the first major surface portion 352 and the second major surface portion 354 can be on opposing sides of an intermediate plane 362 extending through the first edge 356, the second edge 358, and the distal edge 360. In some implementations, the first major surface portion 352 and the second major surface portion 354 can be symmetrical about the intermediate plane 362. Also, in some implementations, the first major surface portion 352 and the second major surface portion 354 can each extend in a respective plane that is substantially parallel to the intermediate plane 362.

Referring back to FIGS. 3A-3B and 3D-3E, the blade 350 includes a first corner 364 extending from the first edge 356 to the distal edge 360, and a second corner 366 extending from the second edge 358 to the distal edge 360. In some examples, the first corner 364 and the second corner 366 can each have a curved shape at the intermediate plane 362. For instance, the first corner 364 and the second corner 366 can each be defined by a radius of curvature.

In some examples, the first corner 364 and the second corner 366 each have a tapered shape. For instance, as shown in FIGS. 3A-3B and 3D-3E, the first corner 364 can include a first face 368 on the first side and a second face 370 on the second side, and the first face 368 and the second face 370 extend in respective planes at respective acute angles relative to the intermediate plane 362. Similarly, the second corner 366 can include a third face 372 and a fourth face 374, and the third face 372 and the fourth face 374 extend in respective planes at respective acute angles relative to the intermediate plane 362. As an example, the respective acute angles of the first face 368, the second face 370, the third face 372, and the fourth face 374 relative to the intermediate plane 362 are each between approximately 5 degrees and approximately 45 degrees. Providing the first corner 364 and/or the second corner 366 with a tapered shape can help to increase a density of the electrosurgical energy (e.g., a electric current density) at the first corner 364 and/or the second corner 366.

Also, for example, the first corner 364 and/or the second corner 366 can taper from (i) a thickness of approximately 0.2 mm at respective interfaces with the first major surface portion 352 and/or the second major surface portion 354 to (ii) a thickness of approximately 0.05 mm at the intermediate plane 362. This can, for example, provide the first corner 364 and/or the second corner 366 with a sufficiently sharp edge to facilitate using the first corner 364 and/or the corner 366 as a scalpel for cutting the target tissue before, during, or after applying the electrosurgery energy to the target tissue. Other examples are also possible.

Although the first corner 364 and the second corner 366 have a tapered shape and a curved shape in FIGS. 3A-3B and 3D-3E, the first corner 364 and/or the second corner 366 can have a different shape in other examples. For instance, in another example, the first corner 364 and/or the second corner 366 can omit the first face 368, the second face 370, the third face 372, and/or the fourth face 374 such that the first corner 364 and/or the second corner 366 are co-planar with the first major surface portion 352 and/or the second major surface portion 354. Also, for instance, the first corner 364 and/or the second corner 366 can additionally or alternatively have a shape that is not defined by a radius of curvature in other examples.

The conductive layer 376 includes a second conductive material coupled to the blade 350 of the elongated body 340, and the second conductive material is different than the first conductive material. As examples, the first conductive material can include stainless steel. Also, as examples, the second conductive material can include silver. In general, the second conductive material of the conductive layer 376 can have one or more properties that can enhance applying the electrosurgical energy to the target tissue relative to the first conductive material of the elongated body 340.

For instance, in some examples, the second conductive material of the conductive layer 376 can have a relatively low coefficient of friction (i.e., the second conductive material can have a coefficient of friction that is less than a coefficient of friction of the first conductive material of the elongated body 340).

During some electrosurgery procedures using a conventional electrode, tissue may adhere to the electrode and, thus, change an effective size and/or shape of the electrode for subsequent portions of the electrosurgery procedures. In some instances, this can impair the conventional electrode from making relatively narrow and precise incisions, thereby negatively impacting a quality and/or a speed of the electrosurgical procedure. However, covering the blade 350 with the conductive layer 376 made from the second conductive material having a relatively low coefficient of friction can help to mitigate tissue adhering to the electrode 314 as the electrode 314 moves through the target tissue during electrosurgery and, thus, improve the quality and/or speed of the electrosurgical procedure.

In some examples, the second conductive material of the conductive layer 376 can additionally or alternatively provide for improved thermal conductivity between the electrode 314 and the target tissue. For instance, the second conductive material of the conductive layer 376 can have a thermal conductivity that is greater than a thermal conductivity of the first conductive material of the elongated body 340. This can help to transfer heat away from the target tissue and better control a desired outcome of the electrosurgical energy on the target tissue.

In some implementations, the second conductive material can be a material that is not conventionally used for electrosurgical electrodes due to, for instance, the material being cost-prohibitive and/or lacking a desired rigidity if the electrodes were entirely formed from the material. However, as shown in FIG. 3C, a relatively small amount of the second conductive material of the conductive layer 376 can be used to cover a relatively larger amount of the first conductive material of the elongated body 340, the electrode 314 can include relatively expensive and/or unconventional materials that can provide improved electrosurgery performance.

The insulator layer 342 includes a non-conductive material and is coupled to the conductive layer 376. More particularly, the insulator layer 342 covers a first portion of the conductive layer 376 (and the blade 350) and the insulator layer 342 does not cover a second portion of the conductive layer 376 (and the blade 250) such that the second conductive material of the conductive layer 376 is exposed at the second portion. This can help to concentrate the electrosurgical energy at the second portion (which is exposed) of the conductive layer 376 (and the blade 350), which can help to achieve a relatively narrower and more precise application of the electrosurgical energy to the target tissue. As such, the electrode 314 can beneficially reduce the electrosurgical energy applied to other tissue adjacent to the target tissue, mitigating (or preventing) increasing a temperature of the other tissue and/or cellular damage to the other tissue.

For example, as shown in FIGS. 3A-3B and 3D-3E, the first portion of the conductive layer 376 can cover the first major surface portion 352, the second major surface portion 354, the first edge 356, the second edge 358, and/or the distal edge 360. Whereas, the second portion of the conductive layer 376 can cover the first corner 364 and the second corner 366. Thus, in this example, the second conductive material of the conductive layer 376 is exposed at the first corner 364 and the second corner 366 such that the electrosurgical energy is concentrated at the first corner 364 and the second corner 366. As such, in operation, the first corner 364 and the second corner 366 can be used to apply the electrosurgical energy to the target tissue in a relatively narrow and precise manner that facilitates cutting and/or coagulating the target tissue with improved performance relative to a conventional electrode that is entirely covered by an insulator.

In some examples, a surface area of the second portion of the conductive layer 376 can be approximately 1 percent to approximately 30 percent of a total surface area of the blade 350. Also, as examples, the non-conductive material of the insulator layer 342 can include at least one of silicone, siloxane or Teflon.

In the examples shown in FIGS. 3A-3B and 3D-3E, a thickness of the first edge 356 is approximately equal to a thickness of the second edge 358. In another example, the thickness of the first edge 356 can be different than the thickness of the second edge 358. For instance, in another example, at least a first one of the first edge 356 or the second edge 358 can have a thickness that is less than approximately 0.2 millimeters (mm), and a second one of the first edge 356 or the second edge 358 can have a thickness that is greater than approximately 0.2 mm. In this example, (i) the first portion of the conductive layer 376 can cover the second one of the first edge 356 or the second edge 358 can be covered by the insulator layer 342, and (ii) the second portion of the conductive layer 376 can cover the at least the first one of the first edge 356 or the second edge 358. This can provide for the conductive layer 376 to be exposed at the relatively sharper one of the first edge 356 or the second edge 358 and used as a leading edge during electrosurgery, whereas the relatively blunter one of the first edge 356 or the second edge 358 to be insulated so as to mitigate transmission of the electrosurgical energy from a trailing edge of the electrode 314 during electrosurgery.

Figure 4:
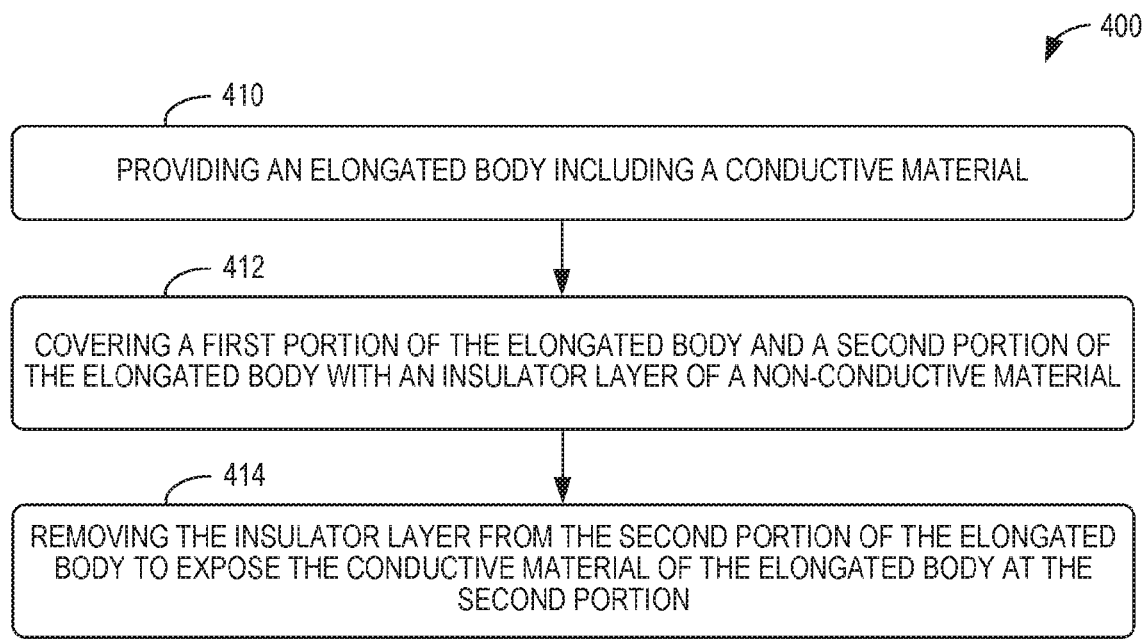
FIG. 4 is a flowchart of a method of making an electrode for an electrosurgical tool, according to an example.

Referring now to FIG. 4, a flowchart for a process 400 of making an electrode for an electrosurgical is shown according to an example. As shown in FIG. 4, the process 400 includes providing an elongated body including a conductive material a block 410. The elongated body extends in an axial direction from a proximal end to a distal end. The proximal end is configured to receive electrosurgical energy from the electrosurgical tool. The elongated body includes a blade configured for at least one of cutting or coagulation of tissue by the electrosurgical energy received from the electrosurgical tool.

The blade includes: (i) a first major surface portion extending, along the axial direction, on a first side of the blade, (ii) a second major surface portion extending, along the axial direction, on a second side of the blade, which is opposite the second side of the blade, (iii) a first edge at a first lateral interface between the first major surface portion and the second major surface portion, (iv) a second edge at a second lateral interface between the first major surface portion and the second major surface portion, (v) a distal edge at a distal interface between the first major surface portion and the second major surface portion, (vi) a first corner extending from the first edge to the distal edge, and (vii) a second corner extending from the second edge to the distal edge.

At block 412, the process 400 includes covering a first portion of the elongated body and a second portion of the elongated body with an insulator layer of a non-conductive material. At block 414, the process 400 includes removing the insulator layer from the second portion of the elongated body to expose the conductive material of the elongated body at the second portion.

Figure 5:
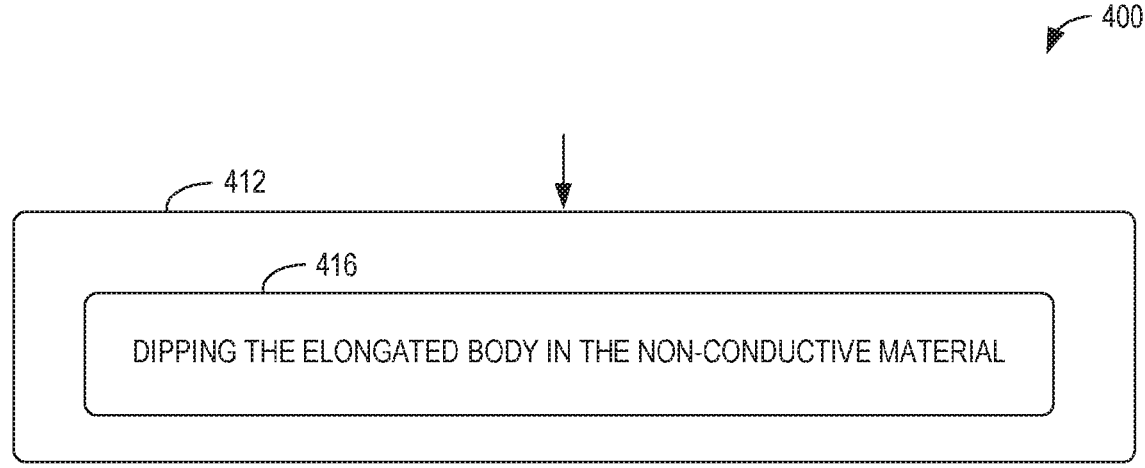
FIG. 5 is a flowchart of a method of making an electrode for an electrosurgical tool for use with the method of FIG. 4, according to an example.
Figure 6:
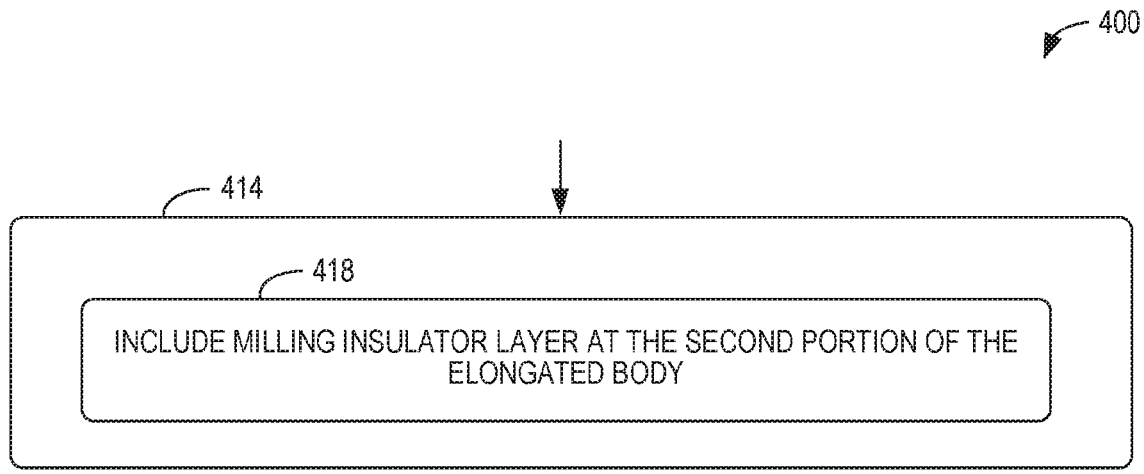
FIG. 6 is a flowchart of a method of making an electrode for an electrosurgical tool for use with the method of FIG. 4, according to an example.

FIGS. 5-6 depict additional aspects of the process 400 according to further examples. As shown in FIG. 5, covering the first portion of the elongated body and the second portion of the elongated body with the insulator layer at block 412 can include dipping the elongated body in the non-conductive material at block 416. As shown in FIG. 6, removing the insulator layer from the second portion of the elongated body at block 414 can include milling insulator layer at the second portion of the elongated body at block 418.

Figure 7:
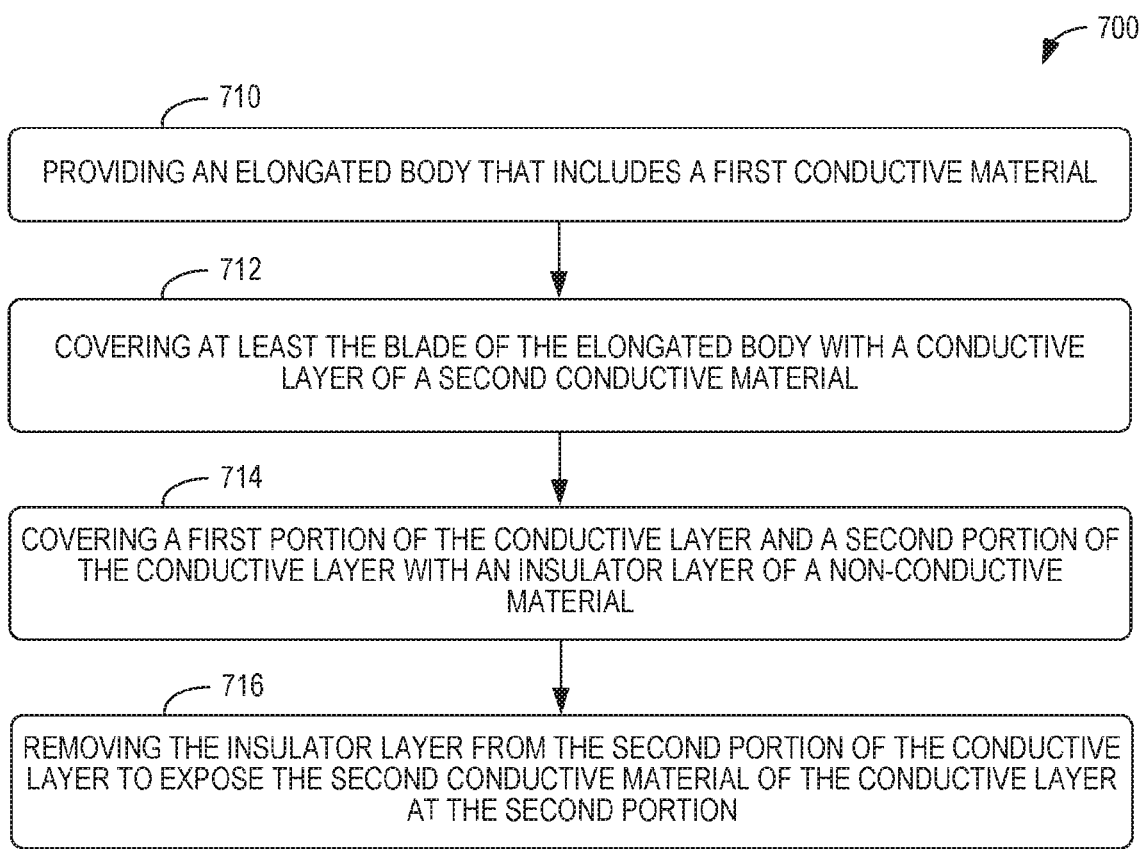
FIG. 7 is a flowchart of a method of making an electrode for an electrosurgical tool, according to an example.

Referring now to FIG. 7, a flowchart for a process 700 of making an electrode for an electrosurgical tool is shown according to another example. As shown in FIG. 7, the process 700 can include providing an elongated body that includes a first conductive material at block 710. The elongated body can extend in an axial direction from a proximal end to a distal end. The proximal end can be configured to receive electrosurgical energy from the electrosurgical tool. The elongated body can include a blade that is configured for at least one of cutting or coagulation of tissue by the electrosurgical energy received from the electrosurgical tool.

The process 700 can also include covering at least the blade of the elongated body with a conductive layer of a second conductive material at block 712. Additionally, the process 700 can include covering a first portion of the conductive layer and a second portion of the conductive layer with an insulator layer of a non-conductive material at block 714. The process 700 can also include removing the insulator layer from the second portion of the conductive layer to expose the second conductive material of the conductive layer at the second portion at block 716.

Further, the disclosure comprises examples according to the following clauses:

Clause 1: In an example, an electrode for an electrosurgical tool is described. The electrode includes an elongated body including a conductive material and extending in an axial direction from a proximal end to a distal end. The proximal end is configured to receive electrosurgical energy from the electrosurgical tool. The elongated body includes a blade configured for at least one of cutting or coagulation of tissue by the electrosurgical energy received from the electrosurgical tool. The blade includes (i) a first major surface portion extending, along the axial direction, on a first side of the blade, (ii) a second major surface portion extending, along the axial direction, on a second side of the blade, which is opposite the second side of the blade, (iii) a first edge at a first lateral interface between the first major surface portion and the second major surface portion, (iv) a second edge at a second lateral interface between the first major surface portion and the second major surface portion, (v) a distal edge at a distal interface between the first major surface portion and the second major surface portion, (vi) a first corner extending from the first edge to the distal edge, and (vii) a second corner extending from the second edge to the distal edge. The electrode also includes an insulator layer including a non-conductive material and coupled to the elongated body. The insulator layer covers a first portion of the blade. The first portion of the blade includes the first major surface portion, the second major surface portion, the first edge, and the second edge. The insulator layer does not cover a second portion of the blade such that the conductive material of the elongated body is exposed at the second portion. The second portion of the blade includes the first corner and the second corner.

Clause 2: In another example, a method of making an electrode for an electrosurgical tool is described. The method includes providing an elongated body including a conductive material. The elongated body extends in an axial direction from a proximal end to a distal end. The proximal end is configured to receive electrosurgical energy from the electrosurgical tool. The elongated body includes a blade configured for at least one of cutting or coagulation of tissue by the electrosurgical energy received from the electrosurgical tool. The blade includes: (i) a first major surface portion extending, along the axial direction, on a first side of the blade, (ii) a second major surface portion extending, along the axial direction, on a second side of the blade, which is opposite the second side of the blade, (iii) a first edge at a first lateral interface between the first major surface portion and the second major surface portion, (iv) a second edge at a second lateral interface between the first major surface portion and the second major surface portion, (v) a distal edge at a distal interface between the first major surface portion and the second major surface portion, (vi) a first corner extending from the first edge to the distal edge, and (vii) a second corner extending from the second edge to the distal edge. The method also includes covering a first portion of the elongated body and a second portion of the elongated body with an insulator layer of a non-conductive material, and removing the insulator layer from the second portion of the elongated body to expose the conductive material of the elongated body at the second portion.

Clause 3: In another example, an electrosurgical tool is described. The electrosurgical tool includes an electrode and an electrosurgical pencil. The electrode includes an elongated body including a conductive material and extending in an axial direction from a proximal end to a distal end. The elongated body includes a blade configured for at least one of cutting or coagulation of tissue by electrosurgical energy. The blade includes: (i) a first major surface portion extending, along the axial direction, on a first side of the blade, (ii) a second major surface portion extending, along the axial direction, on a second side of the blade, which is opposite the second side of the blade, (iii) a first edge at a first lateral interface between the first major surface portion and the second major surface portion, (iv) a second edge at a second lateral interface between the first major surface portion and the second major surface portion, (v) a distal edge at a distal interface between the first major surface portion and the second major surface portion, (vi) a first corner extending from the first edge to the distal edge, and (vii) a second corner extending from the second edge to the distal edge. The electrode also includes an insulator layer including a non-conductive material and coupled to the elongated body. The insulator layer covers a first portion of the blade. The first portion of the blade includes the first major surface portion, the second major surface portion, the first edge, and the second edge. The insulator layer does not cover a second portion of the blade such that the conductive material of the elongated body is exposed at the second portion. The second portion of the blade includes the first corner and the second corner. The electrosurgical pencil includes a housing having a first end and a second end, at least one electrical conductor at the first end and configured to couple to an electrosurgical generator, and a receptacle at the second end and configured to couple to the proximal end of the electrode. The receptacle is configured to supply the electrosurgical energy from the at least one electrical conductor to the electrode.

Clause 4: In another example, an electrode for an electrosurgical tool is described. The electrode includes an elongated body, a conductive layer, and an insulator layer. The elongated body includes a first conductive material and extends in an axial direction from a proximal end to a distal end. The proximal end is configured to receive electrosurgical energy from the electrosurgical tool. The elongated body includes a blade configured for at least one of cutting or coagulation of tissue by the electrosurgical energy received from the electrosurgical tool. The conductive layer includes a second conductive material coupled to the blade of the elongated body. The second conductive material is different than the first conductive material. The insulator layer includes a non-conductive material and is coupled to the conductive layer. The insulator layer covers a first portion of the conductive layer, and the insulator layer does not cover a second portion of the conductive layer such that the conductive layer is exposed at the second portion.

Clause 5: In another example, a method of making an electrode for an electrosurgical tool includes providing an elongated body including a first conductive material. The elongated body extends in an axial direction from a proximal end to a distal end. The proximal end is configured to receive electrosurgical energy from the electrosurgical tool. The elongated body includes a blade configured for at least one of cutting or coagulation of tissue by the electrosurgical energy received from the electrosurgical tool. The method also includes covering at least the blade of the elongated body with a conductive layer of a second conductive material, covering a first portion of the conductive layer and a second portion of the conductive layer with an insulator layer of a non-conductive material, and removing the insulator layer from the second portion of the conductive layer to expose the second conductive material of the conductive layer at the second portion.

Clause 6: In another example, an electrosurgical tool includes an electrode and an electrosurgical pencil. The electrode includes an elongated body, a conductive layer, and an insulator layer. The elongated body includes a first conductive material and extends in an axial direction from a proximal end to a distal end. The elongated body includes a blade configured for at least one of cutting or coagulation of tissue by electrosurgical energy. The conductive layer includes a second conductive material and coupled to the blade of the elongated body. The insulator layer includes a non-conductive material and coupled to the conductive layer. The insulator layer covers a first portion of the conductive layer, and the insulator layer does not cover a second portion of the conductive layer such that the second conductive material of the conductive layer is exposed at the second portion. The electrosurgical pencil includes a housing having a first end and a second end, at least one electrical conductor at the first end and configured to couple to an electrosurgical generator, and a receptacle at the second end and configured to couple to the proximal end of the electrode. The receptacle is configured to supply the electrosurgical energy from the at least one electrical conductor to the electrode.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An electrode for an electrosurgical tool, the electrode comprising:
   an elongated body comprising a conductive material and extending in an axial direction from a proximal end to a distal end,
   wherein the proximal end is configured to receive electrosurgical energy from the electrosurgical tool;
   wherein the elongated body comprises a blade configured for at least one of cutting or coagulation of tissue by the electrosurgical energy received from the electrosurgical tool, wherein the blade comprises:
     a first major surface portion extending, along the axial direction, on a first side of the blade,
     a second major surface portion extending, along the axial direction, on a second side of the blade, wherein the first side of the blade is opposite the second side of the blade,
     a first edge at a first lateral interface between the first major surface portion and the second major surface portion,
     a second edge at a second lateral interface between the first major surface portion and the second major surface portion,
     a distal edge at a distal interface between the first major surface portion and the second major surface portion,
     a first corner extending from the first edge to the distal edge, and
     a second corner extending from the second edge to the distal edge; and
   an insulator layer comprising a non-conductive material and coupled to the elongated body,
   wherein the insulator layer covers a first portion of the blade, wherein the first portion of the blade comprises an entirety of the first major surface portion, an entirety of the second major surface portion, an entirety of the first edge, and an entirety of the second edge,
   wherein the insulator layer does not cover a second portion of the blade such that the conductive material of the elongated body is exposed at the second portion, wherein the second portion of the blade comprises the first corner and the second corner,
   wherein the first major surface portion and the second major surface portion are on opposing sides of an intermediate plane, wherein the intermediate plane extends through the first edge, the second edge, and the distal edge, and wherein the first corner and the second corner each have a tapered shape in which:
(a) the first corner is defined by a first face on the first side and a second face on the second side, the first face and the second face extending in respective planes at respective acute angles relative to the intermediate plane, and
(b) the second corner is defined by a third face and a fourth face, the third face and the fourth face extending in respective planes at respective acute angles relative to the intermediate plane.

2. The electrode according to claim 1, wherein the first major surface portion and the second major surface portion are symmetrical about the intermediate plane.

3. The electrode according to claim 1, wherein the first major surface portion and the second major surface portion each extend in a respective plane that is substantially parallel to the intermediate plane.

4. The electrode according to claim 1, wherein the first corner and the second corner each have a curved shape at the intermediate plane.

5. The electrode according to claim 1, wherein the respective acute angles of the first face, the second face, the third face, and the fourth face relative to the intermediate plane are each between approximately 5 degrees and approximately 45 degrees.

6. The electrode according to claim 1, wherein the first portion of the blade further comprises the distal edge.

7. The electrode according to claim 1, wherein a surface area of the second portion of the blade is approximately 1 percent to approximately 30 percent of a total surface area of the blade.

8. The electrode according to claim 1, wherein the non-conductive material comprises at least one of silicone, siloxane or polytetrafluoroethylene (PTFE).

9. The electrode according to claim 1, wherein the conductive material comprises stainless steel.

10. The electrode according to claim 1, wherein the insulator layer does not cover the proximal end of the elongated body such that the conductive material of the elongated body is exposed at the proximal end.

11. The electrode according to claim 1, wherein the first corner and the second corner are defined by a radius of curvature.

12. A method of making an electrode for an electrosurgical tool, the method comprising:
providing an elongated body comprising a conductive material, wherein the elongated body extends in an axial direction from a proximal end to a distal end, wherein the proximal end is configured to receive electrosurgical energy from the electrosurgical tool, wherein the elongated body comprises a blade configured for at least one of: (i) cutting of tissue by the electrosurgical energy received from the electrosurgical tool or (ii) coagulation of the tissue by the electrosurgical energy received from the electrosurgical tool, wherein the blade comprises:
a first major surface portion extending, along the axial direction, on a first side of the blade,
a second major surface portion extending, along the axial direction, on a second side of the blade, wherein the first side of the blade is opposite the second side of the blade,
a first edge at a first lateral interface between the first major surface portion and the second major surface portion,
a second edge at a second lateral interface between the first major surface portion and the second major surface portion,
a distal edge at a distal interface between the first major surface portion and the second major surface portion,
a first corner extending from the first edge to the distal edge, and
a second corner extending from the second edge to the distal edge,
wherein the first major surface portion and the second major surface portion are on opposing sides of an intermediate plane, wherein the intermediate plane extends through the first edge, the second edge, and the distal edge, and
wherein the first corner and the second corner each have a tapered shape in which:
(a) the first corner is defined by a first face on the first side and a second face on the second side, the first face and the second face extending in respective planes at respective acute angles relative to the intermediate plane, and
(b) the second corner is defined by a third face and a fourth face, the third face and the fourth face extending in respective planes at respective acute angles relative to the intermediate plane; and
covering a first portion of the blade and a second portion of the blade with an insulator layer of a non-conductive material, wherein the first portion of the blade comprises an entirety of the first major surface portion, an entirety of the second major surface portion, an entirety of the first edge, and an entirety of the second edge; and
removing the insulator layer from the second portion of the blade to expose the conductive material of the blade at the second portion, wherein the second portion of the blade comprises the first corner and the second corner.

13. The method according to claim 12, wherein covering the first portion of the elongated body and the second portion of the elongated body with the insulator layer comprises dipping the elongated body in the non-conductive material.

14. The method according to claim 12, wherein removing the insulator layer from the second portion of the elongated body comprises milling the insulator layer at the second portion of the elongated body.

15. An electrosurgical tool comprising:
an electrode comprising:
an elongated body comprising a conductive material and extending in an axial direction from a proximal end to a distal end, wherein the elongated body comprises a blade configured for at least one of: (i) cutting of tissue by electrosurgical energy or (ii) coagulation of the tissue by electrosurgical energy, wherein the blade comprises:
(i) a first major surface portion extending, along the axial direction, on a first side of the blade,
(ii) a second major surface portion extending, along the axial direction, on a second side of the blade, wherein the first side of the blade is opposite the second side of the blade,
(iii) a first edge at a first lateral interface between the first major surface portion and the second major surface portion,
(iv) a second edge at a second lateral interface between the first major surface portion and the second major surface portion, (v) a distal edge at a distal interface between the first major surface portion and the second major surface portion,
(vi) a first corner extending from the first edge to the distal edge, and
(vii) a second corner extending from the second edge to the distal edge,
wherein the first major surface portion and the second major surface portion are on opposing sides of an intermediate plane, wherein the intermediate plane extends through the first edge, the second edge, and the distal edge, and
wherein the first corner and the second corner each have a tapered shape in which:
(a) the first corner is defined by a first face on the first side and a second face on the second side, the first face and the second face extending in respective planes at respective acute angles relative to the intermediate plane, and
(b) the second corner is defined by a third face and a fourth face, the third face and the fourth face extending in respective planes at respective acute angles relative to the intermediate plane; and an insulator layer comprising a non-conductive material and coupled to the elongated body,
wherein the insulator layer covers a first portion of the blade, wherein the first portion of the blade comprises an entirety of the first major surface portion, an entirety of the second major surface portion, an entirety of the first edge, and an entirety of the second edge, and
wherein the insulator layer does not cover a second portion of the blade such that the conductive material of the elongated body is exposed at the second portion, wherein the second portion of the blade comprises the first corner and the second corner; and
an electrosurgical pencil comprising:
a housing having a first end and a second end,
at least one electrical conductor at the first end and configured to couple to an electrosurgical generator, and
a receptacle at the second end and configured to couple to the proximal end of the electrode, wherein the receptacle is configured to supply the electrosurgical energy from the at least one electrical conductor to the electrode.

16. The electrosurgical tool according to claim 15, wherein the electrosurgical pencil is operable in a cutting mode of operation and a coagulation mode of operation, and wherein the electrosurgical tool further comprises at least one user input device configured to select between the cutting mode of operation and the coagulation mode of operation.

\* \* \* \* \*